(12) United States Patent
Urquhart et al.

(10) Patent No.: US 9,042,111 B2
(45) Date of Patent: May 26, 2015

(54) SECURE RACEWAY WITH LOCKABLE ACCESS

(75) Inventors: Sean Urquhart, West Hartford, CT (US); John Marrotte, Windham, CT (US)

(73) Assignee: The Wiremold Company, West Hartford, CT (US)

( * ) Notice: Subject to any disclaimer, the term of this patent is extended or adjusted under 35 U.S.C. 154(b) by 682 days.

(21) Appl. No.: 13/420,045

(22) Filed: Mar. 14, 2012

(65) Prior Publication Data

US 2013/0239628 A1    Sep. 19, 2013

(51) Int. Cl.
| | | |
|---|---|---|
| *H05K 5/00* | (2006.01) | |
| *H02G 3/04* | (2006.01) | |
| *E05B 67/00* | (2006.01) | |
| *E05B 39/00* | (2006.01) | |
| *E05B 17/00* | (2006.01) | |
| *E05B 67/38* | (2006.01) | |
| *E05B 65/00* | (2006.01) | |

(52) U.S. Cl.
CPC .............. *E05B 67/383* (2013.01); *E05B 65/006* (2013.01); *H02G 3/0418* (2013.01); *H02G 3/0487* (2013.01)

(58) Field of Classification Search
CPC ... H02G 3/0418; H02G 3/0487; E05B 65/006
USPC ............... 361/759; 70/51, 439, 466; 174/68.1
See application file for complete search history.

(56) References Cited

U.S. PATENT DOCUMENTS

| | | | |
|---|---|---|---|
| 6,605,782 B1 * | 8/2003 | Krietzman et al. | 174/101 |
| 7,049,517 B2 * | 5/2006 | McCarthy et al. | 174/68.3 |
| 7,053,303 B2 * | 5/2006 | McCarthy et al. | 174/68.3 |
| 2008/0110671 A1 * | 5/2008 | Halliday et al. | 174/481 |

* cited by examiner

*Primary Examiner* — Timothy Thompson
*Assistant Examiner* — Rhadames J Alonzo Miller
(74) *Attorney, Agent, or Firm* — McCormick, Paulding & Huber LLP

(57) ABSTRACT

A system for securing an access opening of a cable raceway using a single padlock includes a cover having a securing wall and opposed first and second sidewalls, which form a channel for accommodating at least a portion of the cable raceway with the securing wall covering the access opening. First and second insert bars engage the first and second sidewalls and a lock bar engages the first and second insert bars and may be locked in an engaged position to prevent the first and second insert bars from being disengaged with the cover and to secure the cover about the cable raceway preventing access to the access opening.

20 Claims, 4 Drawing Sheets

SECURE RACEWAY WITH LOCKABLE ACCESS

BACKGROUND OF THE INVENTION

1. Field of the Invention

This invention relates generally to cable raceways for the distribution of electrical and data/telecommunication cables in buildings and, more particularly to systems for securing said cable raceways against intrusion and tampering.

2. Description of the Related Art

Cable raceways are structures that distribute electrical and data/telecommunication wiring in office buildings, warehouses, stores and other similar facilities where electrical and data/telecommunication wiring is desired. In some applications, for example, in government buildings or other heightened security environments, it is desirous to provide a Protective Distribution System (PDS) where the cable raceway distribution system is secured against intrusion and/or tampering.

One conventional method for securing cable raceway distribution systems is to glue or epoxy covers over access openings in raceway distribution systems, where access is necessary during installation, thereby preventing future access to the electrical and data/telecommunication wiring within the cable raceway. However, securing a cable raceway in this manner is disadvantageous in that it prevents future access, even if authorized, in the event that changes need to be made to the distribution system. Therefore, it is desirous to provide an improved system for securing access openings in cable raceway distribution systems.

SUMMARY OF THE INVENTION

According to the present invention, a system for securing an access opening of a cable raceway using a single padlock or other suitable locking device includes a cover having a securing wall and opposed first and second sidewalls, which form a channel for accommodating at least a portion of the cable raceway. The securing wall may cover the access opening when the cover is engaged with the cable raceway. First and second insert bars may engage the first and second sidewalls and a lock bar may engage the first and second insert bars and may be locked in an engaged position by the padlock or other suitable locking device to prevent the first and second insert bars from being disengaged with the cover and to secure the cover about the cable raceway, thereby preventing access and tampering through the access opening.

The first and second sidewalls may be substantially perpendicular to the securing wall and may include slots for engaging the first and second insert bars. In some embodiments, the slots may be formed on tabs of the first and second sidewalls.

The first and second insert bars may include position stops, which may be projections, formed at one end thereof. The first and second insert bars may include slots for engaging the lock bar formed at ends opposite the position stops.

The lock bar may include a position stop formed at one end thereof and a hole for accommodating a shackle portion of the padlock at an end opposite the position stop. In some embodiments, the position stop may include at least one projection.

The system of the present invention advantageously allows for authorized access to the cable raceway through the access opening, while still allowing the access opening to be secured against intrusion and/or tampering when access is not required. Additionally, unlike the glue used to secure a cover to a cable raceway according to the prior art, all of the locking components of the system of the present invention are visible from the external of the cable raceway. Thus, any tampering with or damage to the system of the present invention will advantageously be evident from outside of the cable raceway. Additionally, the system advantageously reduces the cost associated with securing access openings against intrusion and/or tampering by allowing each access opening to be secured with the single padlock or other suitable locking device.

These and other objects, features and advantages of the present invention will become apparent in light of the following detailed description of non-limiting embodiments, with reference to the accompanying drawings.

DETAILED DESCRIPTION OF THE INVENTION

Figure 1:
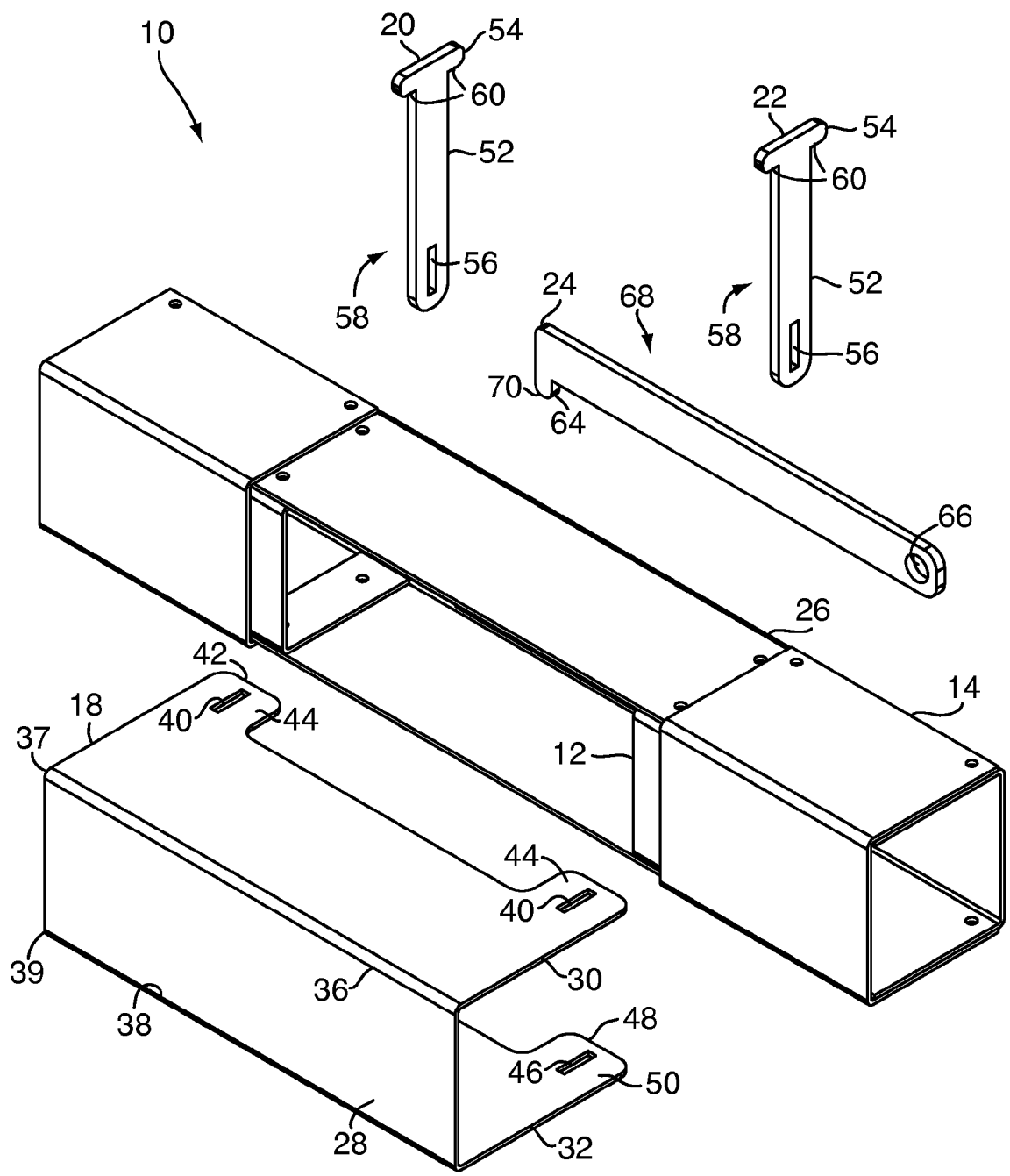
FIG. 1 is an exploded front perspective view of a system for securing an access opening of a cable raceway according to an embodiment of the present invention.

Referring to FIG. 1, a system 10 for securing an access opening 12 of a cable raceway 14 of a cable raceway distribution system is shown. The system 10 includes a cover 18, a first insert bar 20, a second insert bar 22 and a lock bar 24, which are configured to interface about a portion 26 of the cable raceway 14 that includes the access opening 12 to secure the access opening 12 against intrusion and/or tampering.

The cover 18 includes a securing wall 28, a first sidewall 30 and a second sidewall 32 that form a channel 34 for accommodating the portion 26 of the cable raceway 14 that includes the access opening 12. The first sidewall 30 extends from a first end 36 of the securing wall 28 at a first radius 37 and the second sidewall 32 extends from a second end 38 of the securing wall 28 that is opposite the first side 36 at a second radius 39, thereby forming the channel 34 between the first sidewall 30 and the second sidewall 32. In some embodiments, the first sidewall 30 and the second sidewall 32 may be substantially perpendicular to the securing wall 28. However, in other embodiments, the first sidewall 30 and second sidewall 32 may extend away from the securing wall 28 at some angle other than ninety degrees to accommodate cable raceways 14 of differing shape and size.

The first sidewall 30 includes a plurality of slots 40 formed therethrough proximate to an end 42 of the first sidewall 30 distal from securing wall 28. The slots 40 may be formed on tabs 44 or may simply be formed through the body of the first sidewall 30 if tabs 44 are not included in the cover 18.

The second sidewall 32 includes a plurality of slots 46 formed therethrough proximate to an end 48 of the second sidewall 32 distal from securing wall 28. Like the slots 40, the slots 46 may be formed on tabs 50 or may simply be formed through the body of the second sidewall 32 if tabs 50 are not included in the cover 18. Preferably, the slots 46 of the second sidewall 32 are substantially identical to and substantially align with the slots 40 of the first sidewall 30 to allow the first insert bar 20 and the second insert bar 22 to be slidably engaged therein, as will be discussed in greater detail below.

Figure 2:
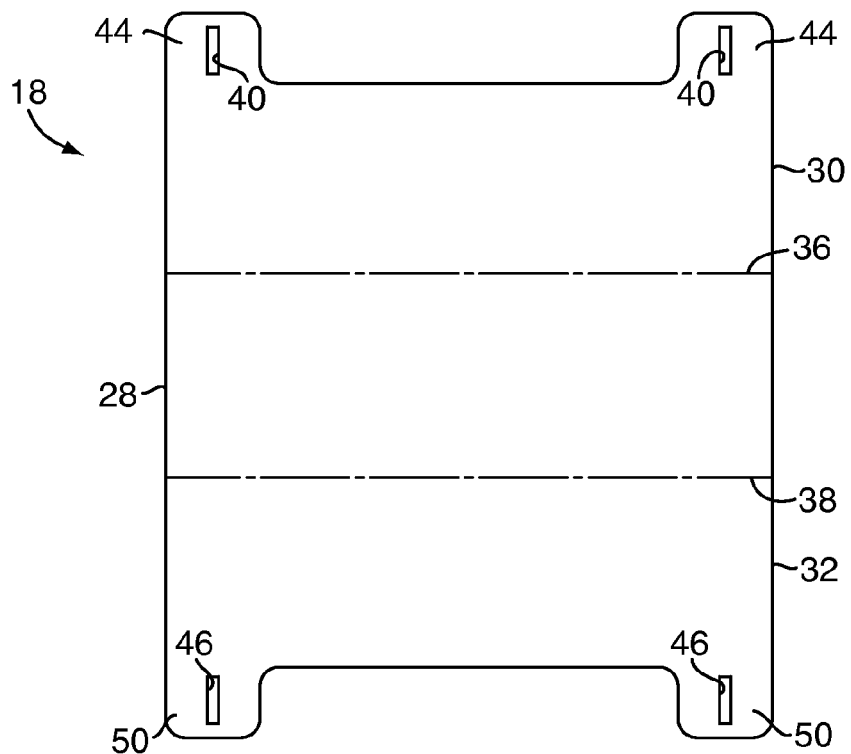
FIG. 2 is a front view of a flat pattern of a cover of the system of FIG. 1 according to some embodiments of the present invention.

Referring to FIG. 2, in some embodiments, the cover 18 may be formed from a single sheet of metal that is then bent and shaped at the first end 36 to form the first radius 37 (shown in FIG. 1) and at the second end 38 to form the second radius 39 (shown in FIG. 1) to properly position the first sidewall 30 and the second sidewall 32 relative to the securing wall 28.

Referring back to FIG. 1, the first insert bar 20 and the second insert bar 22 are preferably substantially identical, each including an elongated body 52 with a position stop 54 formed at one end thereof. Each elongated body 52 has a slot 56 formed therethrough at an end 58 opposite the position stop 54 and has a cross-sectional shape that is substantially the same and sized slightly smaller than the slots 40 of the first sidewall 30 and the slots 46 of the second sidewall 32 such that each elongated body 52 may slidably engage in the slots 40 and the slots 46. For example, as seen in FIG. 1, the slots 40, the slots 46 and the cross-sectional shape of the elongated body 52 are all rectangular. The position stop 54 includes one or more projections 60 that extend outward from the elongated body 52 to prevent the first insert bar 20 and the second insert bar 22 from passing entirely through the slots 40 and the slots 46 when the elongated body 52 is slidably engaged therein.

The lock bar 24 includes an elongated body 62 with a position stop 64 formed at one end thereof and a hole 66 for accommodating a shackle portion of a padlock or other suitable locking device at the opposite end 68. The elongated body 62 has a cross-sectional shape that is substantially the same and sized slightly smaller than the slots 56 of the first insert bar 20 and the second insert bar 22 such that the elongated body 62 may slidably engage in the slots 56. For example, as seen in FIG. 1, the slots 56 and the cross-sectional shape of the elongated body 62 are rectangular. The position stop 64 includes one or more projections 70 that extend outward from the elongated body 62 to prevent the lock bar 24 from passing entirely through the slots 56 when the elongated body 52 is slidably engaged therein.

Figure 3:
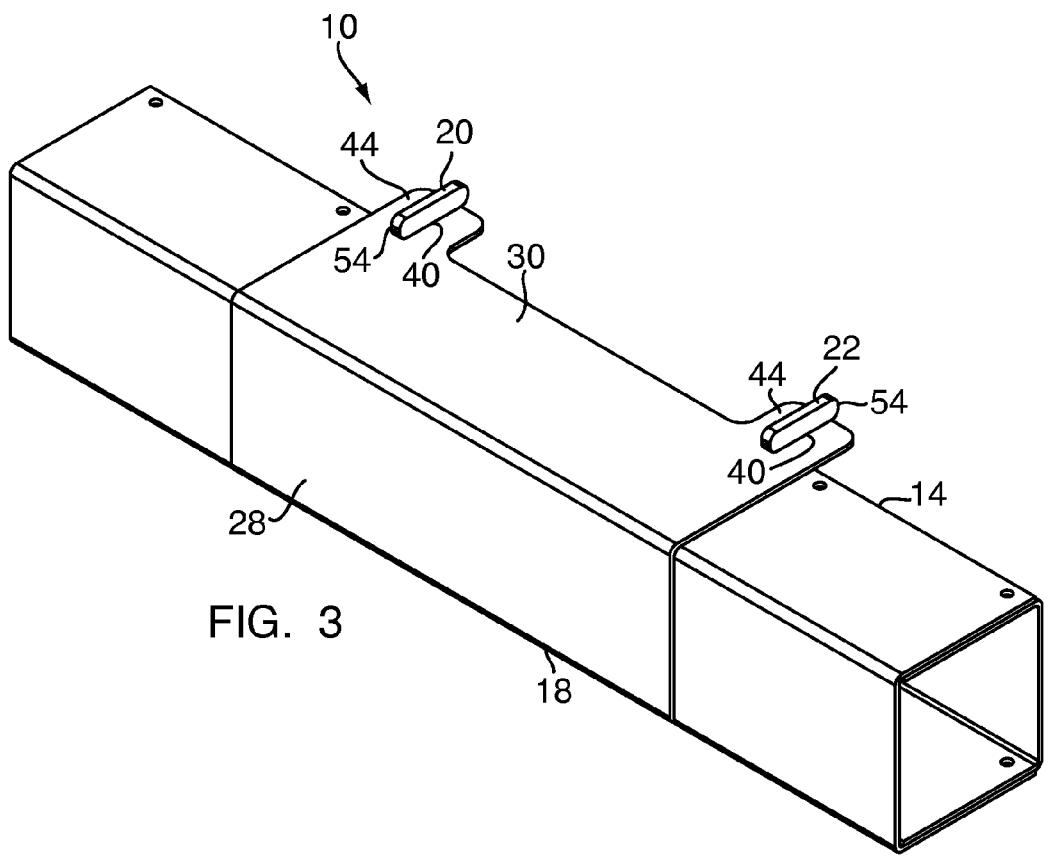
FIG. 3 is a front perspective view of the system of FIG. 1.
Figure 4:
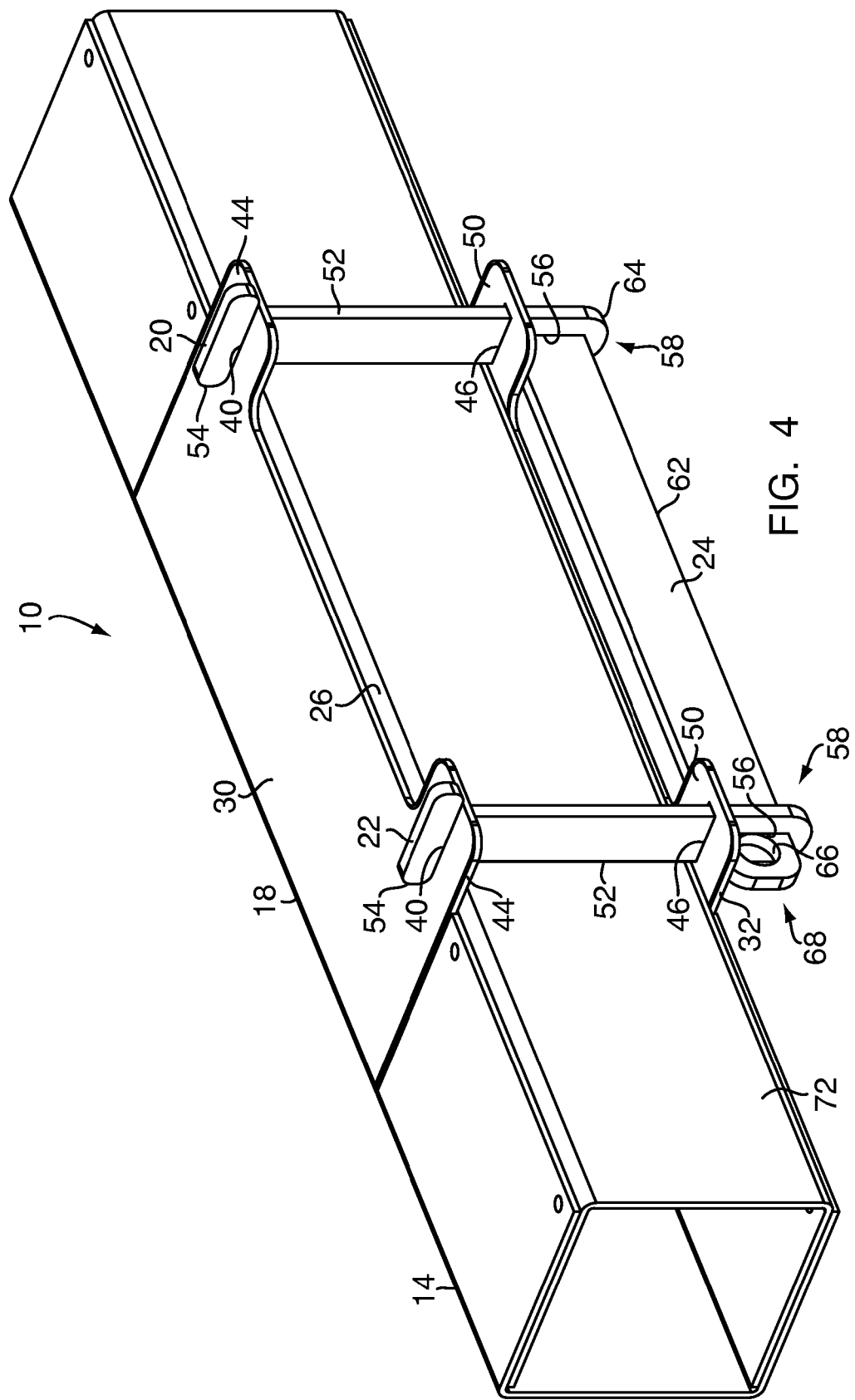
FIG. 4 is a rear perspective view of the system of FIG. 1.

Referring to FIG. 3 and FIG. 4, in order to install the system 10 to the cable raceway 14 over an access opening 12 (shown in FIG. 1), the cover 18 is slid onto the portion 26 of the cable raceway 14 that includes the access opening 12 (shown in FIG. 1), with the first sidewall 30 and the second sidewall 32 slidably engaging the cable raceway 14 and the securing wall 28 covering the access opening 12 (shown in FIG. 1). The first sidewall 30 and the second sidewall 32 are configured so that the portions containing the slots 40 and the slots 46, such as tabs 44 and tabs 50, extend beyond the cable raceway 14. Preferably, an end of each slot 40 and 46 most proximate the securing wall 28 is positioned just beyond a rear wall 72 of the cable raceway 14 when the cover 18 is fully engaged with the cable raceway 14.

The elongated body 52 of the first insert bar 20 may then be slid into one slot 40 of the first sidewall 30 and through the substantially aligned slot 46 of the second sidewall 32 until the position stop 54 of the first insert bar 20 contact the first sidewall 30. Similarly, the elongated body 52 of the second insert bar 22 may be slid into a second slot 40 of the first sidewall 30 and through the substantially aligned slot 46 of the second sidewall 32 until the position stops 54 of the second insert bar 22 contact the first sidewall 30. The first insert bar 20 and the second insert bar 22 are configured so that the ends 58 containing the slots 56 extend beyond the cable raceway second sidewall 32. Preferably, an end of each slot 56 most proximate the second sidewall 32 is positioned just beyond the second sidewall 32 when the position stops 54 are fully engaged with the first sidewall 30.

Referring to FIG. 4, the elongated body 62 of the lock bar 24 may then be slid into the slot 56 of the first insert bar 20 and then through the slot 56 of the second insert bar 22 until the position stop 64 of the lock bar 24 contact the first insert bar 20. The lock bar 24 is configured so that the hole 66 at the end 68 extends beyond the second insert bar 22. Preferably, an edge of the hole 66 is positioned just beyond the second insert bar 22 when the position stop 64 is fully engaged with the first insert bar 20.

The shackle portion of the padlock may then be passed through the hole 66 and the padlock may be locked to prevent the lock bar 24 from being removed from the slots 56 of the first insert bar 20 and the second insert bar 22. Locking the lock bar 24 in the slots 56 prevents the first insert bar 20 and the second insert bar 22 from being removed from the slots 40 and 46 of the cover 18, which, in turn, prevents the cover 18 from being tampered with or removed from the portion 26 of the cable raceway 14. Thus, when the padlock is locked on the lock bar 24, the securing wall 28 (shown in FIG. 1) remains positioned over the access opening 12 (shown in FIG. 1) to secure the access opening 12 (shown in FIG. 1) against intrusion and/or tampering. Advantageously, the system 10 of the present invention may be employed at essentially any access opening 12 (shown in FIG. 1) in the raceway distribution system in the manner described above.

Figure 5:
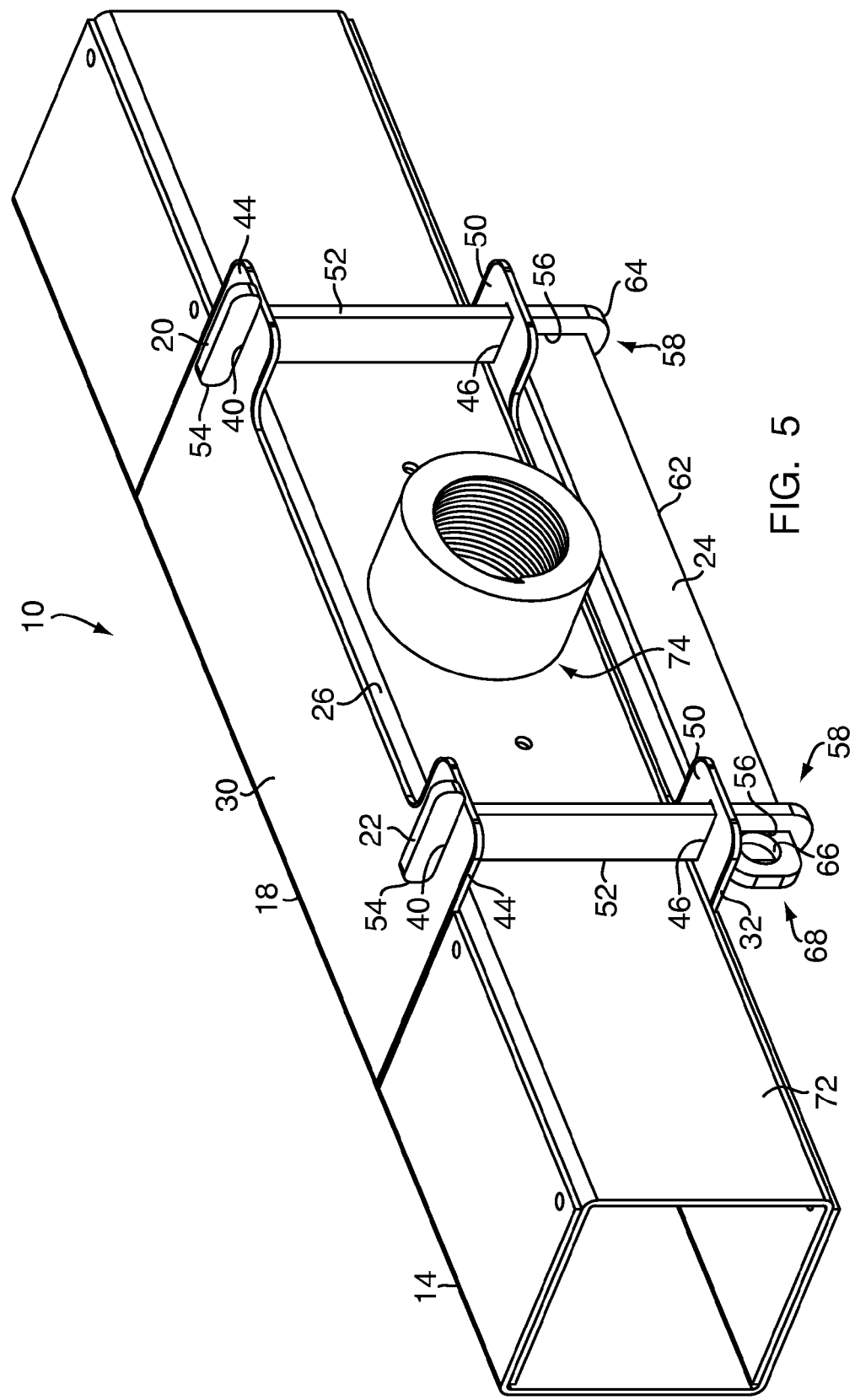
FIG. 5 is a rear perspective view of the system of FIG. 1 securing an access opening at a junction point of a raceway distribution system.

Referring to FIG. 5, in some embodiments, the system 10 may be implemented to secure the access opening 12 (shown in FIG. 1) at a junction point 74 of the cable raceway 14 where wiring is fed into and/or out of the cable raceway 14. For example, the wiring may be fed from a second cable raceway (not shown) of the raceway distribution system that is arranged perpendicular to the cable raceway 14. Advantageously, the first insert bar 20, second insert bar 22 and lock bar 24 of the system 10 are arranged about the periphery of the junction point 74 so as not to interfere therewith.

Referring back to FIG. 1, the system 10 of the present invention advantageously allows for authorized access to the cable raceway 14 through the access opening 12 by allowing authorized personnel to unlock the padlock or other suitable locking device, e.g. with the appropriate key or combination, thereby allowing the lock bar 24 to be removed from the slots 56, which, in turn, allows the first insert bar 20 and second insert bar 24 to be removed from the slots 40 and 46 and allows the cover 18 to be removed from the cable raceway 14. Once access is no longer required, the access opening 12 may be re-secured against intrusion and/or tampering in substantially the same manner discussed above.

Additionally, unlike the glue used to secure a cover to a cable raceway according to the prior art, all of the locking components of the system 10 of the present invention are visible from the external of the cable raceway 14. Thus, any tampering with or damage to the system 10 of the present invention will advantageously be evident from outside of the cable raceway 14. The system 10 of the present invention is also advantageous in that it reduces the cost associated with securing access openings 12 against intrusion by allowing each access opening 12 to be secured with a single padlock or other suitable locking device.

Although this invention has been shown and described with respect to the detailed embodiments thereof, it will be understood by those skilled in the art that various changes in form and detail thereof may be made without departing from the spirit and the scope of the invention. For example, although the various slots 40, 46 and 56 are shown as being substantially rectangular, it should be understood by those skilled in the art that the slots 40, 46 and 56 could be formed in various other shapes to provide similar or enhanced functionality. Similarly, although the hole 66 of the lock bar 24 is shown as being substantially circular, the hole 66 could instead be formed in as some other shape, such as a square, without altering the functionality of the present invention.

What is claimed is:

1. A system for securing an access opening of a cable raceway using a single padlock, the system comprising:
   a cover including a securing wall and opposed first and second sidewalls extending from the securing wall at opposite ends thereof to form a channel for accommodating at least a portion of the cable raceway, the securing wall covering the access opening;
   first and second elongated insert bars adapted to engage the first and second sidewalls to secure the cover about the cable raceway; and
   a lock bar adapted to engage the first and second elongated insert bars to prevent the first and second insert bars from being disengaged with the cover;
   wherein the lock bar includes a position stop at one end thereof and a hole at the other end for accommodating a shackle portion of the padlock to prevent the lock bar from being disengaged from the first and second insert bars, thereby securing the cover over to the cable raceway and preventing access to the access opening.

2. The system according to claim 1, wherein the first and second sidewalls are substantially perpendicular to the securing wall.

3. The system according to claim 1, wherein the first and second sidewalls include slots for engaging the first and second insert bars.

4. The system according to claim 3, wherein the slots of the first and second sidewall are formed on tabs.

5. The system according to claim 3, wherein the first and second insert bars include position stops formed at one end thereof.

6. The system according to claim 5, wherein the position stops include at least one projection.

7. The system according to claim 1, wherein the first and second insert bars include slots for engaging the lock bar.

8. The system according to claim 7, wherein the lock bar includes a position stop formed at one end thereof.

9. The system according to claim 8, wherein the lock bar includes a hole for accommodating a shackle portion of the padlock at an end opposite the position stop.

10. The system according to claim 8, wherein the position stop includes at least one projection.

11. A system for securing an access opening of a cable raceway, the system comprising:
    a cover forming a channel for accommodating at least a portion of the cable raceway;
    a first insert bar having an elongated body with a position stop formed at one end thereof;
    a second insert bar having an elongated body with a position stop formed at one end thereof; and
    a lock bar having an elongated body with a position stop formed at one end thereof and a hole at the opposing end;
    wherein the cover includes a plurality of slots for slidably receiving the first and second insert bars after the cable raceway is accommodated in the channel to prevent the cover from being removed from the cable raceway;
    wherein the first and second insert bars each include a slot for slidably engaging the lock bar after the first and second inserts are received in the plurality of slots of the cover to prevent the first and second insert bars from being removed therefrom; and
    wherein a shackle portion of a padlock may be accommodated within the hole of the lock bar to prevent the lock bar from being disengaged from the first and second insert bars.

12. The system according to claim 11, wherein the cover includes:
    a securing wall for covering the access opening;
    a first sidewall extending from the securing wall at a first end thereof; and
    a second sidewall extending from the securing wall at a second end thereof opposite the first end.

13. The system according to claim 12, wherein the first sidewall and the second sidewall are substantially perpendicular to the securing wall.

14. The system according to claim 12, wherein the plurality of slots of the cover includes a first plurality of slots formed through the first sidewall and a second plurality of slots formed through the second sidewall.

15. The system according to claim 14, wherein the slots of the second plurality of slots substantially align with the slots of the first plurality of slots.

16. The system according to claim 14, wherein the first sidewall and the second sidewall each include a plurality of tabs formed opposite the first end and second end, respectively, and wherein the first plurality of slots and the second plurality of slots are formed through the tabs.

17. The system according to claim 11, wherein at least one position stop includes a projection.

18. A system for making tampering with an access opening of a cable raceway evident, the system comprising:
    a cover for accommodating at least a portion of the cable raceway, the cover comprising:
       a securing wall for covering the access opening;
       a first sidewall extending substantially perpendicular from the securing wall at a first end thereof, the first sidewall having at least a first slot and a second slot formed therethrough;
       a second sidewall extending substantially perpendicular from the securing wall at a second end thereof opposite the first end, the second sidewall having at least a third slot and a fourth slot formed therethrough;
    a first insert bar having an elongated body with a position stop formed at one end thereof and at least a fifth slot formed at the opposite end, the elongated body adapted to slidably engage in the first slot of the first sidewall and the third slot of the second sidewall;
    a second insert bar having an elongated body with a position stop formed at one end thereof and at least a sixth slot formed at the opposite end, the elongated body adapted to slidably engage in the second slot of the first sidewall and the fourth slot of the second sidewall; and
    a lock bar having an elongated body with a position stop formed at one end thereof and a hole for accommodating a shackle portion of a padlock at the opposite end of the elongated body.

19. The system according to claim 18, wherein the slots are substantially rectangular.

20. The system according to claim 18, wherein the first sidewall and second sidewall each includes a first tab and a second tab formed opposite the first end and second end, respectively;
    wherein the first slot and the second slot of the first sidewall are formed through the first tab and second tab of the first sidewall; and wherein the third slot and the fourth slot of the second sidewall are formed through the first tab and second tab of the second sidewall.

* * * * *